No. 642,164. Patented Jan. 30, 1900.
K. O. F. SCHROTTKE.
ALTERNATING CURRENT WATTMETER.
(Application filed Apr. 22, 1899.)
(No Model.) 2 Sheets—Sheet 1

Witnesses
Inventor:
K. O. F. Schrottke,
By Charles A. Brown & Cragg
Attorneys.

No. 642,164. Patented Jan. 30, 1900.
K. O. F. SCHROTTKE.
ALTERNATING CURRENT WATTMETER.
(Application filed Apr. 22, 1899.)
(No Model.) 2 Sheets—Sheet 2.
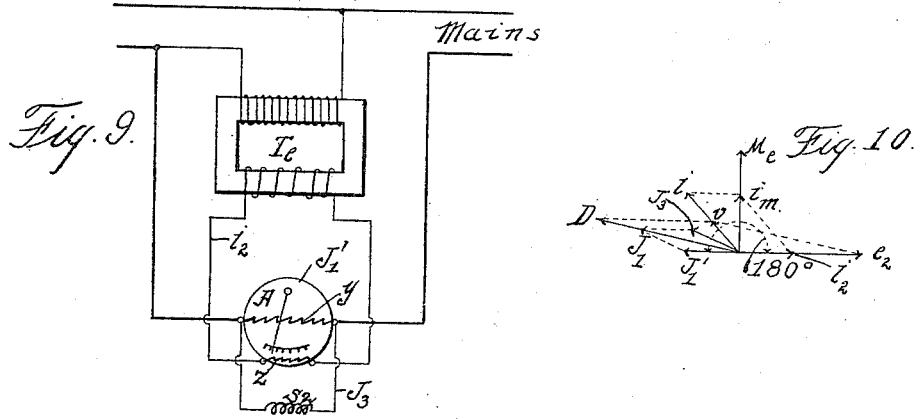
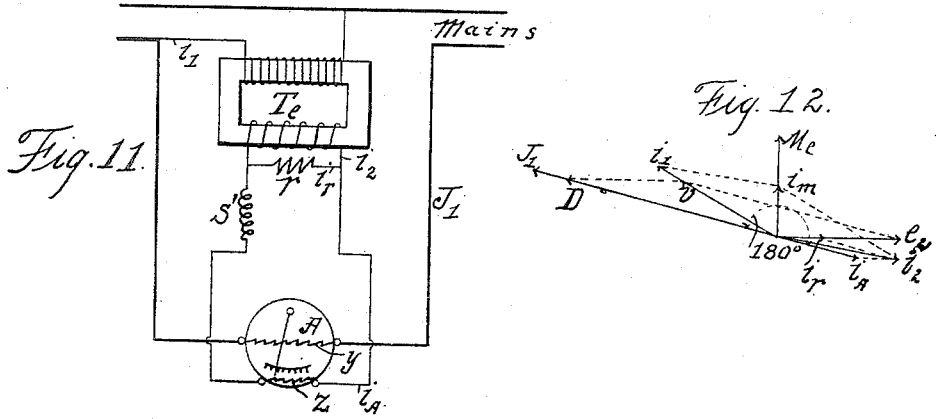
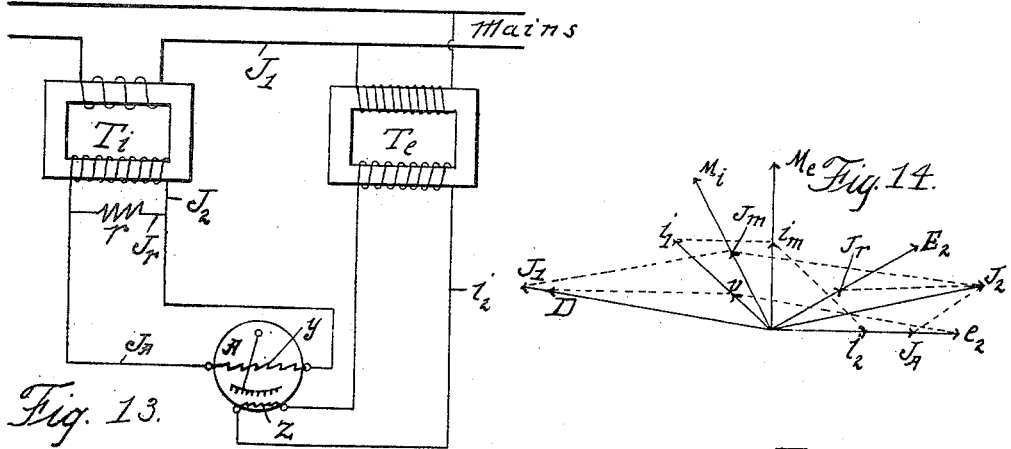
Witnesses
May Zabel
Nina L. Swartwout
Inventor:
K. O. F. Schrottke,
By Charles A. Brown & Cragg
Attorneys.

UNITED STATES PATENT OFFICE.

KARL OTTO FRANZ SCHROTTKE, OF BERLIN, GERMANY, ASSIGNOR TO THE SIEMENS & HALSKE ELECTRIC COMPANY OF AMERICA, OF CHICAGO, ILLINOIS.

ALTERNATING-CURRENT WATTMETER.

SPECIFICATION forming part of Letters Patent No. 642,164, dated January 30, 1900.

Application filed April 22, 1899. Serial No. 714,044. (No model.)

*To all whom it may concern:*

Be it known that I, KARL OTTO FRANZ SCHROTTKE, a subject of the Emperor of Germany, residing at Berlin, Germany, have invented a certain new and useful Improvement in Alternating-Current Wattmeters, (Case No. 186,) of which the following is a full, clear, concise, and exact description.

My invention relates primarily to alternating-current wattmeters, and has for its object the provision of improved means for adjusting differences in phase in the energizing-circuits of the meter.

The invention is primarily adapted for use in connection with those circuits conveying heavy currents or currents of high electromotive force in the measurement of which great difficulty has been found in the past owing to the inadequate means heretofore employed.

While my invention is primarily adapted for use in connection with alternating-current meters, I do not wish to be limited in its application, as it may be employed in connection with other motive devices.

My invention will be more particularly described by reference to the accompanying drawings and will be pointed out in the claims.

Figure 1:
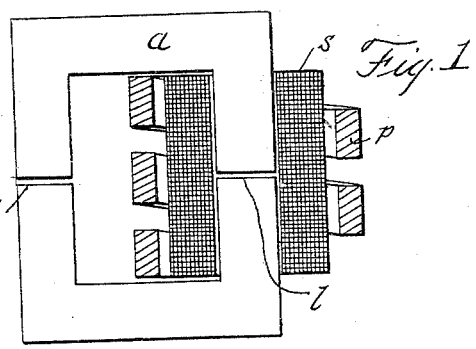
Figure 2:
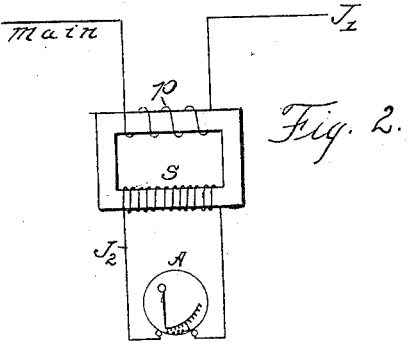
Figure 3:
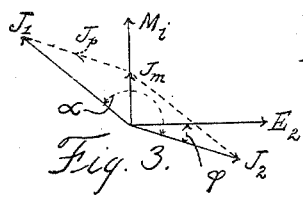
Figure 4:
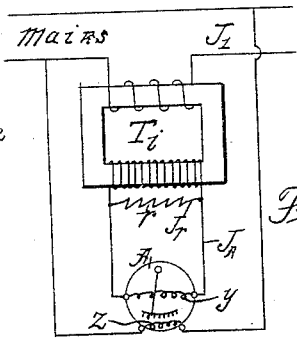
Figure 5:
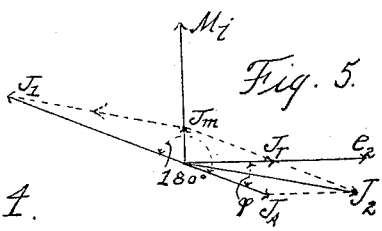
Figure 6:
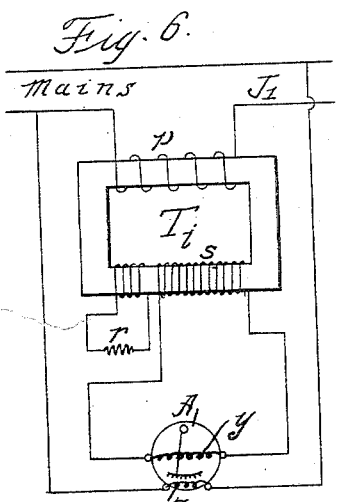
Figure 7:
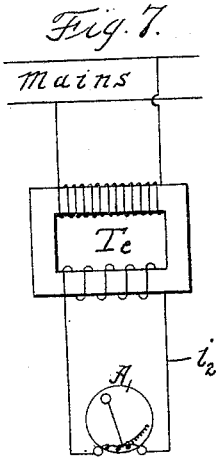
Figure 8:
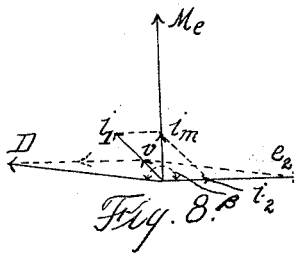

In the drawings, Figure 1 is a sectional view of a transformer which may be employed in practicing my invention. Fig. 2 is a diagram indicating the circuit connections of an ampere indicator or meter. Fig. 3 is a diagram illustrating the phase relations of the currents in the circuits illustrated in Fig. 2. Fig. 4 is a diagrammatic view indicating a watt meter or indicator, together with the circuit connections, arranged in accordance with my invention. Fig. 5 is a diagrammatic view illustrating the phase relations of the currents in the circuits shown in Fig. 4. Fig. 6 is a diagrammatic view indicating apparatus equivalent to that shown in Fig. 4, the circuits being somewhat modified. Fig. 7 is a diagrammatic view indicating the circuit connections of a pressure or volt meter or indicator. Fig. 8 is a diagrammatic view indicating the phase relations of the currents shown in Fig. 7. Fig. 9 is a diagrammatic view indicating another type of alternating-current watt meter or recorder constructed in accordance with my invention. Fig. 10 is a diagrammatic view indicating the phase relations in the currents shown in Fig. 9. Fig. 11 indicates, diagrammatically, a third embodiment of my invention. Fig. 12 shows, diagrammatically, the phase relations between the currents in the circuits indicated in Fig. 11. Fig. 13 illustrates a fourth embodiment of my invention. Fig. 14 diagrammatically indicates the phase relations between the currents in the different circuits shown in Fig. 13.

Like letters indicate like parts throughout figures illustrating similar apparatus.

In Fig. 1 I have shown a transformer constructed in a well-known way, this transformer being adapted for use in measuring the amperage of alternating current, one winding of the transformer $p$ being of large cross-section and constituting the series winding, the secondary winding $s$ being preferably surrounded by the primary winding, a suitable magnetic core $a$ being provided.

In Fig. 2 is diagrammatically illustrated the transformer shown in Fig. 1, an ampere or current indicator A being included in circuit with the secondary coil, the arrangement being such that the current may readily be measured by passing only a very small proportion of the current through the delicate measuring instrument.

The apparatus illustrated in Fig. 2 is of course adapted only to indicate the volume of current flowing in the consumption-circuit, which includes the primary coil $p$.

In accordance with my invention transformers are employed whose primary coils may either be in series with the consumption-circuit, as shown in Fig. 4, or the primary coil may be in a bridge of the conductors of the consumption-circuit, as shown, for example, in Fig. 9, or two separate transformers may be employed, one having its primary coil in series with the conductors of the consumption-circuit and the other with its primary coil in a bridge of the conductors of the consumption-circuit, as shown, for example, in Fig. 13.

I will first describe the preferred embodiments of my invention employing transformers whose primary coils are connected in series with the mains of the consumption-circuit in order that the invention may thoroughly be understood and will then briefly describe those embodiments of my invention in which transformers are employed whose primary coils are in bridges of the main conductors of the consumption-circuits.

In order to constitute a wattmeter, the instrument has, as is well known, one energizing-circuit in series with the main conductors and another energizing-circuit in a bridge of the main conductors; but this arrangement simply will not be sufficient accurately to measure the work for the reason to be presently pointed out. Referring to Figs. 2 and 3, the current $J_2$ in the secondary circuit may have such a shift of phase, as is indicated in Fig. 3, from the electromotive force in the secondary circuit. It may be considered that the primary current $J_1$ is resolved into two components—the magnetizing-current $J_m$, serving to create the transformer-field $M_i$, and a component $J_p$ in opposition to the secondary current $J_2$ flowing through the measuring instrument A. The current $J_2$ is displaced from the primary current by an angle $\alpha$ and lags behind its pressure $E_2$ by an angle $\varphi$. The ratio $J_2:J_1$, to be sure, does not absolutely correspond to the translating ratio of the transformer; but it will practically remain constant if the air-gap $l$ in the transformer is large, so that it will merely be necessary to multiply the indications of the instrument A by a constant in order to ascertain the amperage of the primary current $J_1$ that is being used.

While the apparatus shown in Fig. 2 is adapted to the measurement of the volume of current, it is not adapted to the measurement of electrical work by the mere addition of a bridge-coil to the indicator, because the current $J_2$ flowing through the measuring instrument A has a shift of phase with relation to the primary current $J_1$, such, for example, as is indicated in Fig. 3, which by not being taken into consideration would result in erroneous measurements.

In order to operate the meter accurately, I provide means for shifting the secondary current $J_2$ exactly one hundred and eighty degrees. To this end I may adopt the arrangement diagrammatically indicated in Fig. 4, in which an energizing-circuit in a bridge of the main conductors is added to the measuring instrument A. In order to shift the phase of the secondary current $J_2$, I provide an active resistance, which is preferably an ohmic and non-inductive resistance $r$, in parallel with the secondary coil of the transformer and the coil $y$ of the instrument in circuit with the secondary coil. By means of the active resistance the current $J_2$ becomes the resultant of the current $J_r$ in the resistance $r$ and the current $J_A$ in the coil of the meter in circuit with the secondary coil of the transformer, the latter current by the proper adjustment of the resistance $r$ being shifted one hundred and eighty degrees in phase from the primary current $J_1$. By this means the indications of the watt meter or indicator become independent of the shift in phase in the current-transformer. In general the shift of phase produced by the self-induction of that coil of the watt meter or indicator in circuit with the secondary coil of the transformer is sufficiently large. If not, it may be brought to the desired degree of self-induction by switching into circuit therewith conductors of sufficient self-induction.

In Fig. 5 is shown the effect of the additional resistance $r$ upon the current in the instrument. The secondary current $J_2$ now consists of two components—the current $J_r$ in the non-inductive resistance $r$ and the current $J_A$ in the instrument. The current $J_A$ is shown as displaced exactly one hundred and eighty degrees from the primary pressure $J_1$. The current $J_r$ is in phase with its pressure $e_2$.

In Fig. 6 I have shown an apparatus equivalent to that shown in Fig. 4, the active non-inductive resistance $r$ being included in a circuit inductively related to the coil of the transformer in circuit with an energizing-coil of the indicator, the phase of the current in the latter coil being suitably adjusted by the resistance $r$.

I will now briefly describe the embodiment of my invention employing transformers whose primary coil is of high resistance and connected in a bridge between the main conductors of the consumption-circuit.

An apparatus for measuring the potential difference in the mains is diagrammatically indicated in Fig. 7, the phase relations being diagrammatically indicated in Fig. 8. The apparatus shown in Fig. 7 is adapted to measure the voltage of high-pressure currents, the voltage of the current $i_2$ in the secondary circuit being sufficiently reduced to prevent bodily injury to the operator.

In Fig. 8 the primary current $i_1$ may again be considered divided into two components, the magnetizing component creating the field $M_e$ and a component opposite to the secondary current $i_2$. The secondary pressure $e_2$ lags behind the primary pressure $D$ by an angle $\beta$, the current $i_1$ being in phase with the magnetizing component $v$ of the pressure. As will be clear from this figure, the current $i_2$ in the secondary circuit of the transformer, which circuit includes the energizing-coil of the indicator, has a difference of phase from the electromotive force $D$ of the primary circuit, and although this difference in phase has but little appreciable effect in the measurement of electromotive forces its presence would render the measurement of the energy consumed in the primary circuit faulty.

In adapting the transformers connected, as shown in Fig. 7, to the measurement of energy I may adopt the arrangement shown in either Fig. 9 or Fig. 11. In the apparatus shown in Figs. 9 and 11 I have included one energizing-coil $y$ of each indicator in series with a main conductor. In Fig. 9 I have connected a coil $S_2$, having suitable self-induction, in parallel with the energizing-coil of the meter in series with the main conductor. By proper adjustment of the coil $S_2$ the current $J'_1$ in the said series coil of the indicator may be shifted in phase so that it may differ in phase from the shunt-current by exactly one hundred and eighty degrees, as indicated in Fig. 10, assuming that the main current $J_1$ has no difference in phase with relation to the electromotive force $D$ of the main or primary current, so that in this case also the energy may be measured independently of the phase differences in the transformer.

Fig. 10 is an amplification of Fig. 8. The main current $J_1$ is shown in this figure as in phase with its pressure $D$ and divided into two components, the component $J_3$ flowing in the coil $S$ and the component $J'_1$ flowing through the coils of the instrument. The currents $J'_1$ and $i_2$ are shown one hundred and eighty degrees apart.

In Fig. 11 instead of modifying the current flowing through the series energizing-coil $y$ of the indicator I modify the current flowing through the shunt-coil $z$ or that coil in circuit with the secondary coil of the transformer. An active inductionless resistance $r$ is included in parallel with the secondary coil of the transformer and the energizing-coil $z$ of the indicator, by which resistance the current $i_A$ may be shifted one hundred and eighty degrees in phase from the electromotive force $D$ in the primary circuit, as is indicated, diagrammatically, in Fig. 12. In some instances also I have employed an induction-coil $S'$ more accurately to adjust the apparatus.

In Fig. 12 the primary current $i_1$ consists of two components—the current $i_m$ creating the field $M_e$ and a component in opposition to the secondary current $i_2$. The primary pressure $D$ has two components—the pressure $v$ in phase with the current $i_1$ and a component in opposition to the secondary pressure $e_2$. The secondary current $i_2$ is divided into two components—the component $i_r$ in the non-inductive resistance $r$ and the component $i_A$ flowing through the coils of the instrument. The resistance $v$ may be so chosen that the component $i_A$ will be displaced one hundred and eighty degrees from the pressure $D$, as is clearly illustrated in the figure.

In Fig. 13 I have employed two transformers, the primary of one being included in series with the main circuit and the primary of the other in a bridge of the main circuit. Each secondary coil of the transformer is included in series with an energizing-coil of the indicator. The secondary coil of the transformer $T_i$ is included in series with the energizing-coil $y$, and the secondary of the transformer $T_e$ is connected in circuit with the energizing-circuit $z$. A non-inductive resistance $r$, suitably adjusted, is connected in parallel with the secondary of the transformer $T_i$ and the energizing-coil $y$. By the proper adjustment of the resistance $r$ the required phase adjustment in the indicator may be secured, as diagrammatically indicated in Fig. 14. In this figure the impressed pressure $D$ has two components—the magnetizing component $v$ and a component in opposition to the secondary pressure $e_2$. The primary current $J_1$ in the transformer $T_1$ has also two components—the magnetizing component $J_m$, creating the field $M_i$, and a component in opposition to the secondary current $J_2$. The primary current $i_1$ of the transformer $T_e$ has two components—the magnetizing component $i_m$, creating the field $M_e$, and a component in opposition to the secondary current $i_2$. The current $J_2$ is divided into two components—the component $J_r$ in the resistance $r$ and the component $J_A$ in the coils of the instrument. The pressure $E$ across the resistance $r$ is in phase with the current $J_r$. The currents $J_A$ and $i_2$ must be in phase, as is shown in the figure.

Having thus described my invention, I claim as new and desire to secure by Letters Patent—

1. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a phase-modifier to restore the proper phase relation between the currents in the coils of the meter that would otherwise be destroyed by the transformer, substantially as described.

2. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a phase-modifier in parallel with one of the windings of the meter to restore the proper phase relation between the currents in the coils of the meter that would otherwise be destroyed by the transformer, substantially as described.

3. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a phase-modifier in parallel with the secondary coil of the transformer and the coil of the meter connected therewith to restore the proper phase relation between the currents in the coils of the meter that would otherwise be destroyed by the transformer, substantially as described.

4. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a phase-modifier associated with the secondary circuit, to restore the proper phase relation between the currents in the coils of the meter that would otherwise be destroyed by the transformer, substantially as described.

5. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a resistance in parallel with one of the windings of the meter to restore the proper phase relation between the currents in the coils of the meter that would otherwise be destroyed by the transformer, substantially as described.

6. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a resistance in parallel with the secondary coil of the transformer and the coil of the meter connected therewith to restore the proper phase relation between the currents in the coils of the meter that would otherwise be destroyed by the transformer, substantially as described.

7. The combination with a transformer having a winding in circuit with main conductors, of a secondary winding therefor, a wattmeter having one winding out of circuit with the main conductors and in circuit with the secondary of the transformer, a second winding receiving its current independently of the said transformer, and a resistance associated with the secondary circuit, to restore the proper phase relation between the currents in the coils of the meter that would otherwise be destroyed by the transformer, substantially as described.

8. The combination with a transformer having a winding in a bridge of main conductors, of a secondary winding therefor, a wattmeter having one winding out of circuit with the main conductors and in circuit with the secondary of the transformer, a second winding in series with a main conductor, and a phase-modifier connected in parallel with one of the meter-windings to restore the proper phase relation between the currents in the coils of the meter that would otherwise be destroyed by the transformer, substantially as described.

9. The combination with a transformer having a winding in a bridge of main conductors, of a secondary winding therefor, a wattmeter having one winding out of circuit with the main conductors and in circuit with the secondary of the transformer, a second winding in series with a main conductor, and a resistance included in parallel with the secondary coil of the transformer and the winding of the meter connected therewith, to restore the proper phase relation between the currents in the coils of the meter that would otherwise be destroyed by the transformer, substantially as described.

10. The combination with the main conductors of an alternating-current-supply circuit, of a transformer having a winding in a bridge of the main conductors of the circuit, a secondary for the transformer, a wattmeter having one winding out of circuit with the main conductors and in circuit with the secondary of the transformer, a second winding of the meter receiving its current independently of the transformer, and a phase-modifier for restoring the proper phase relation between the currents in the coils of the meter that would otherwise be destroyed by the transformer, substantially as described.

In witness whereof I hereunto subscribe my name this 28th day of March, A. D. 1899.

KARL OTTO FRANZ SCHROTTKE.

Witnesses:
WOLDEMAR HAUPT,
HENRY HASPER.